US005717059A

United States Patent [19]
Forschner

[11] Patent Number: 5,717,059
[45] Date of Patent: Feb. 10, 1998

[54] METHOD FOR PREPARING POLY-P-DIOXANONE POLYMER

[75] Inventor: Thomas Clayton Forschner, Richmond, Tex.

[73] Assignee: Shell Oil Company, Houston, Tex.

[21] Appl. No.: 572,546

[22] Filed: Dec. 14, 1995

[51] Int. Cl.$^6$ ................................................. C08G 63/08
[52] U.S. Cl. ................ 528/354; 528/357; 528/503; 525/411; 525/415; 549/274
[58] Field of Search ........................ 528/354, 357, 528/503; 525/411, 415; 549/274

[56] References Cited

U.S. PATENT DOCUMENTS

| | | | |
|---|---|---|---|
| 3,021,314 | 2/1962 | Cox et al. | 260/78.3 |
| 3,021,316 | 2/1962 | Cox et al. | 260/783.3 |
| 3,063,967 | 11/1962 | Schultz | 260/78.3 |
| 3,063,968 | 11/1962 | Schultz | 260/78.3 |
| 3,391,126 | 7/1968 | Baggett et al. | 260/78.3 |
| 3,645,941 | 2/1972 | Snapp et al. | 260/18 |
| 4,653,497 | 3/1987 | Bezwada et al. | 128/335.5 |
| 5,047,048 | 9/1991 | Bezwada et al. | 606/231 |
| 5,310,945 | 5/1994 | Forschner | 549/274 |

Primary Examiner—Duc Truong

[57] ABSTRACT

Poly-p-dioxanone is prepared in a process comprising:

(a) heating a reaction mixture comprising p-dioxanone and an effective amount of a polymerization catalyst under conditions of temperature and pressure effective to produce a reaction product mixture comprising molten poly-p-dioxanone and unreacted p-dioxanone;

(b) solidifying the reaction product mixture and dividing it into a plurality of solid particles;

(c) introducing the solid particles into a separator vessel and exposing the solid particles to a temperature within the range of about 25° to about 110° C. under reduced pressure and sweeping the particles with an inert gas, thereby separating the reaction product mixture into an unreacted p-dioxanone portion and a poly-p-dioxanone portion comprising less than about 3 weight percent p-dioxanone; and (d) removing the poly-p-dioxanone portion from the separator.

The invention process permits the economical production of high molecular weight poly-p-dioxanone in the melt.

8 Claims, 1 Drawing Sheet

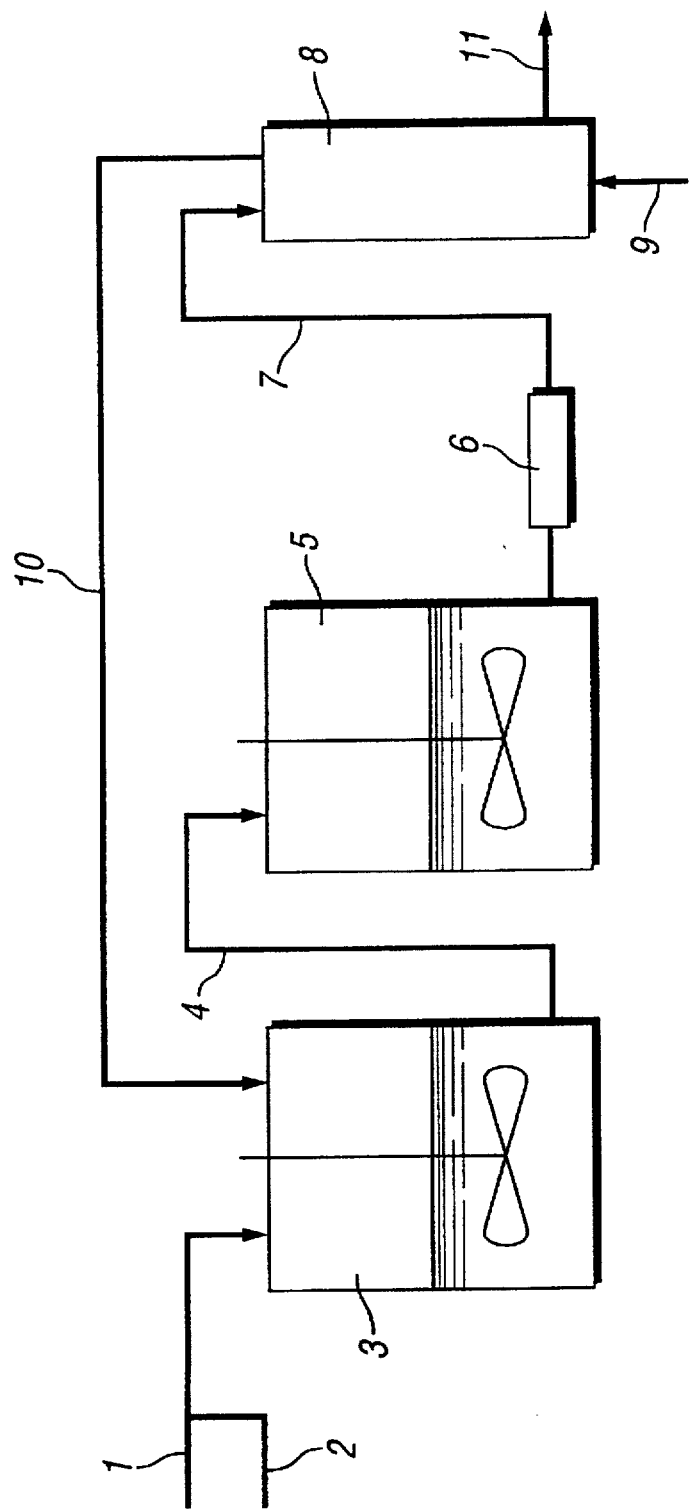

METHOD FOR PREPARING POLY-P-DIOXANONE POLYMER

BACKGROUND OF THE INVENTION

This invention relates to the preparation of poly-p-dioxanone. In a specific aspect, the invention relates to the preparation of high molecular weight poly-p-dioxanone in the melt.

p-Dioxanone is known to be readily polymerized in the solid state below the melting point (about 110° C.) of the polymer. With active polymerization catalysts such as aluminum and zinc complexes, high molecular weight polymer can be obtained with conversions of p-dioxanone monomer to polymer approaching 100%.

To permit commercial scale-up of the polymerization without adversely affecting process economics, it would be desirable to carry out the polymerization reaction in the melt rather than in the solid state. However, as a result of the dynamic chemical equilibrium between p-dioxanone and poly-p-dioxanone above the melting point of the polymer, conversion of monomer to polymer in the melt is typically limited to about 78%. Removal and recovery of unreacted monomer from the melt is difficult because of the tendency, given this dynamic equilibrium, of the polymer to degrade or lose molecular weight as the monomer is removed.

It is therefore an object of the invention to provide an economical process for preparing poly-p-dioxanone in the melt.

SUMMARY OF THE INVENTION

According to the invention, poly-p-dioxanone is prepared in a process comprising:

(a) heating a reaction mixture comprising p-dioxanone and an effective amount of a polymerization catalyst under conditions of temperature and pressure effective to produce a reaction product mixture comprising molten poly-p-dioxanone and unreacted p-dioxanone;

(b) solidifying the reaction product mixture and dividing it into a plurality of solid particles; and (c) introducing the solid particles into a solids separator vessel, exposing the solid particles to reduced pressure and to a temperature within the range of about 25° and about 110° C., and sweeping the particles with an inert gas, thereby separating a major portion of the unreacted p-dioxanone from the poly-p-dioxane; and (d) removing a polymer product comprising poly-p-dioxanone and less than 3 wt % p-dioxanone from the separator.

The invention process permits the economical production of high molecular weight poly-p-dioxanone in the melt.

BRIEF DESCRIPTION OF THE DRAWING

The FIGURE is a schematic flow diagram of one embodiment of the invention poly-p-dioxanone preparation process.

DETAILED DESCRIPTION OF THE INVENTION

The starting monomer for preparation of the desired high molecular weight poly-p-dioxanone is an optionally alkyl-substituted 2-p-dioxanone according to the formula

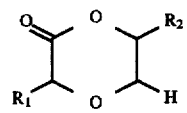

in which each of $R_1$ and $R_2$ can be H or $C_{1-3}$ alkyl. Such a monomer can be prepared, for example, by the oxidative dehydrogenation of dialkylene glycols such as diethylene glycol. To prepare high molecular weight polymer, it is desirable to use monomer which has a purity of at least about 98%. Such purity can generally be achieved by distillation of impurities from the monomer.

If desired for modification of polymer properties, other cyclic lactones such as lactide and glycolide can be copolymerized with the p-dioxanone. As used herein, "poly-p-dioxanone" shall refer to polymers comprising p-dioxanone monomer units and up to about 40 mole percent other cyclic lactone comonomer units.

The polymerization reaction is carried out in the presence of an effective amount of a polymerization catalyst. Suitable polymerization catalysts include, for example, organo tin compounds such as dibutyl tin oxide, dibutyl tin dilaurate and dibutyl tin di-2-ethylhexanoate (U.S. Pat. No. 3,645,941), organozinc compounds such as diethyl zinc (U.S. Pat. No. 3,063,968) and organoaluminum compounds such as triisobutyl aluminum (U.S. Pat. No. 3,063,967). The preferred polymerization catalyst for the invention melt polymerization process is tin octoate.

The catalyst is present in the polymerization reaction mixture in an amount within the range of about 0.0001 to about 3, preferably about 0.007 to about 0.08 weight percent, based on the weight of the monomer. The polymerization reaction can be carried out at a pressure generally within the range of about 0.05 to about 5 atmospheres, preferably about 0.5 to about 2 atm. The polymerization reaction temperature is a temperature higher than the melting temperature of the target polymer. For poly-p-dioxanone, the polymerization temperature will range from about 110° to about 175° C., preferably about 120° to about 150° C. The polymerization reaction is preferably carried out in a stirred reactor vessel under an inert or reducing atmosphere such as nitrogen, argon or hydrogen. The polymerization can be carried out continuously or batchwise, in a single vessel or a series of two or more reactors. Reaction time can vary depending upon catalyst concentration, temperature, pressure and other reaction variables, but will generally range within about 0.5 to about 5 hours. The reaction is complete when the target molecular weight or viscosity is reached, or monomer/polymer equilibrium is reached.

The product of the polymerization stage of the invention process is a molten mixture of predominately poly-p-dioxanone and a lesser amount of molten unreacted p-dioxanone. The mixture is removed from the polymerization vessel and formed into particles such as nibs, chips, pellets and the like. Preferably, this process is carried out by pumping the molten mixture from the reactor into a screw extruder, and extruding, cooling, solidifying and then dividing the mixture into solid particles.

The particles are introduced into a solids separator vessel and swept with an inert gas such as nitrogen or argon at an elevated temperature within the range of about 25° C. and about 110° C. and at reduced pressure within the range of about 0.00001 to about 1 atm. The separation process is carried out for a time effective to remove the major portion of the monomer from the mixture, generally a time of about 5 to about 24 hours.

The poly-p-dioxanone preparation process can be described by reference to the Figure. Shown is a continuous process in which two reactors are operated in series. P-dioxanone monomer, with any desired comonomer, and the polymerization catalyst in a suitable solvent are introduced into stirred reactor vessel 3 via 1 and 2, respectively. The contents of the reactor are heated above the melting temperature of the desired polymer or copolymer to a monomer conversion of about 25 to about 40 mole percent.

The molten reaction product mixture containing poly-p-dioxanone, unreacted p-dioxanone and catalyst is transferred to a second stirred reactor 5, wherein polymerization is continued in the melt to greater conversion and higher molecular weight. The molten reaction product mixture 6 containing poly-p-dioxanone, up to about 25 weight percent p-dioxanone and catalyst residue is cooled and passed through extruder 6 for formation of the mass into pellets. The pellets are passed via 7 to solid-state separation vessel 8 operated at a temperature within the range of about 25° C. and 105° C., preferably 40° to 75° C., and a pressure within the range of about 0.00001 to about 1 atm, preferably about 0.0001 to about 0.1 atm.

An inert gas such as nitrogen is introduced into the separation vessel for flow in contact with the poly-p-dioxanone pellets. Unreacted p-dioxanone is entrained in the inert gas, removed overhead and passed via 10 to reactor 3. Solid-form polymer 11 is removed from the separator vessel.

The molecular weight of the product poly-p-dioxanone will depend upon the desired application but will typically range from about 50,000 to about 300,000.

The polymerization can be carried out in batch or continuous form.

The poly-p-dioxanone polymer prepared in the invention process can be used in coatings, films, molding powders and fibers, particularly where degradability or biodegradability is desired.

EXAMPLE 1

Polymerization of Poly-p-Dioxanone with Simultaneous Removal of Monomer from the Melt This experiment demonstrates the problem of monomer removal directly from the poly-p-dioxanone melt.

A standard polymerization kettle was charged with 50.06 g of p-dioxanone monomer and 0.15 mL of 0.33M tin octoate in toluene. The mixture was heated to 125° C. for 3 hours and sampled for molecular weight determination. The weight average molecular weight at this stage of the polymerization was 57,200 (28,100 number average molecular weight).

The temperature was reduced to 115° C. and vacuum was applied for 2.5 hour to remove unreacted monomer. The polymer was then removed from the reactor and analyzed by GPC (PMMA standard in HFIPA solvent). The weight average molecular weight of the polymer at this stage was 23,500 (number average 10,000), which was 41% (35.5%) of the molecular weight of the polymer after melt polymerization, suggesting degradation of the polymer as a result of a shift in chemical equilibrium as the monomer was removed from the polymer/monomer mixture.

EXAMPLE 2

Polymerization of p-Dioxanone

A polymerization kettle was charged with 235.9 g of p-dioxanone monomer. A 2.3 ml aliquot of 0.1M tin octoate solution in toluene was injected into the reactor at 60° C., and the temperature was raised to 124° C. After 3 hours of stirring the reactor contents, the melt contained an approximately 75:25 molar mixture of polymer and monomer. GPC analysis (PMMA standard in HFIPA solvent) of the polymer gave a molecular weight average of 271,900 (number average 117,600). This mixture was removed from the reactor and cut into nibs. The nibs were placed into a solid-state separator vessel. The vessel was heated to 70° C. under vacuum and swept with 70° C. nitrogen for 24 hours. At the end of the separation process, the polymer contained less than 1% monomer and had retained its original molecular weight (271,900; 115,400).

EXAMPLE 3

Polymerization of p-Dioxanone

A polymerization kettle was charged with 391.3 g of p-dioxanone monomer. A 3.8-ml aliquot of 0.1M tin octoate solution in toluene was injected into the reactor at 60° C., and the temperature was raised to 125° C. After 2 hours of stirring, the melt contained a mixture of about 75:25 polymer:monomer. GPC analysis (PMMA standard in HFIPA solvent) of the polymer gave a molecular weight average of 158,600 (number average 75,900). The mixture was removed from the reactor and cut into nibs. The nibs were placed into a separator vessel. The vessel was heated to 70° C. under vacuum and swept with 60° C. nitrogen for 24 hours. At the end of the separation process, the polymer contained less than 2.2% monomer and had retained its original molecular weight (184,600; number average 84,900).

We claim:

1. A continuous process for melt polymerization of p-dioxanone, the process comprising:
   (a) heating a reaction mixture comprising p-dioxanone and an effective amount of a polymerization catalyst under conditions of temperature and pressure effective to produce a reaction product mixture comprising molten poly-p-dioxanone and unreacted p-dioxanone;
   (b) solidifying the reaction product mixture and dividing it into a plurality of solid particles;
   (c) introducing the solid particles into a separator vessel, exposing the solid particles to a temperature within the range of about 20° to about 110° C. under reduced pressure, and sweeping the particles with an inert gas thereby separating the reaction product mixture into an unreacted p-dioxanone portion and a poly-p-dioxanone portion containing less than 3 wt % p-dioxanone;
   (d) returning the unreacted p-dioxanone portion to the process of step (a); and
   (e) removing the poly-p-dioxanone portion from the separator vessel.

2. The process of claim 1 in which the process of steps (a), (b) and (c) is a continuous process.

3. The process of claim 1 in which step (a) is carried out at a temperature greater than 110° C.

4. The process of claim 1 in which step (a) is carried out at a pressure within the range of about 0.05 to about 5 atm.

5. The process of claim 1 in which the poly-p-dioxanone is a copolymer of p-dioxanone and a second cyclic lactone.

6. The process of claim 1 in which the molecular weight of the poly-p-dioxanone is within the range of about 50,000 to about 300,000.

7. The process of claim 1 in which the polymerization catalyst comprises at least one of a tin compound, a zinc compound and an aluminum compound.

8. The process of claim 5 in which said second cyclic lactone is selected from at least one of lactide and glycolide.

* * * * *